United States Patent [19]

Ninke et al.

[11] 3,794,910

[45] Feb. 26, 1974

[54] IONTOPHORESIS AND CONDUCTIVITY ANALYSIS CIRCUIT

[75] Inventors: Donald A. Ninke, Austin, Tex.; James F. LaHay, St. Louis, Mo.

[73] Assignee: Sherwood Medical Industries, Inc., St. Louis, Mo.

[22] Filed: July 26, 1971

[21] Appl. No.: 166,284

Related U.S. Application Data

[62] Division of Ser. No. 880,807, Nov. 28, 1969, abandoned.

[52] U.S. Cl. .......................... 324/30 R, 128/2.1 R
[51] Int. Cl. ...................... G01n 27/02, A61b 5/00
[58] Field of Search . 324/30 R, 30 B, 29, 62, 57 Pl, 324/131, 132; 128/2.1 R

[56] References Cited
UNITED STATES PATENTS

| | | | |
|---|---|---|---|
| 3,657,649 | 4/1972 | Odorici | 324/115 |
| 3,493,857 | 2/1970 | Silverman | 324/30 B X |
| 3,430,130 | 2/1969 | Schneider | 324/30 |
| 3,399,666 | 9/1968 | Broach | 128/2.1 R |
| 3,079,556 | 2/1963 | Connelly et al. | 324/131 |
| 3,302,102 | 1/1967 | Lace | 324/30 B |
| 3,399,037 | 8/1968 | Eckfeldt | 324/30 B |

FOREIGN PATENTS OR APPLICATIONS

| | | | |
|---|---|---|---|
| 860,681 | 2/1961 | Great Britain | 324/132 |

OTHER PUBLICATIONS

Silicon Zener Diode and Rectifier Handbook – pub. by Motorola–1961– pp. 112–113.

*Primary Examiner*—Alfred E. Smith
*Assistant Examiner*—Rolf Hille

[57] ABSTRACT

An iontophoresis inducing circuit includes means to limit to a safe value and to control a generated direct current for connection to iontophoresis electrodes on a patient in order to produce sweat. A sweat sample is collected and analyzed to detect for cystic fibrosis. A sweat analysis circuit includes solid state switching for passing current of continuously alternating polarity through the sweat sample, and nonlinear means for converting the current into a direct reading of milliequivalents of sodium chloride per liter.

10 Claims, 1 Drawing Figure

PATENTED FEB 26 1974
3,794,910
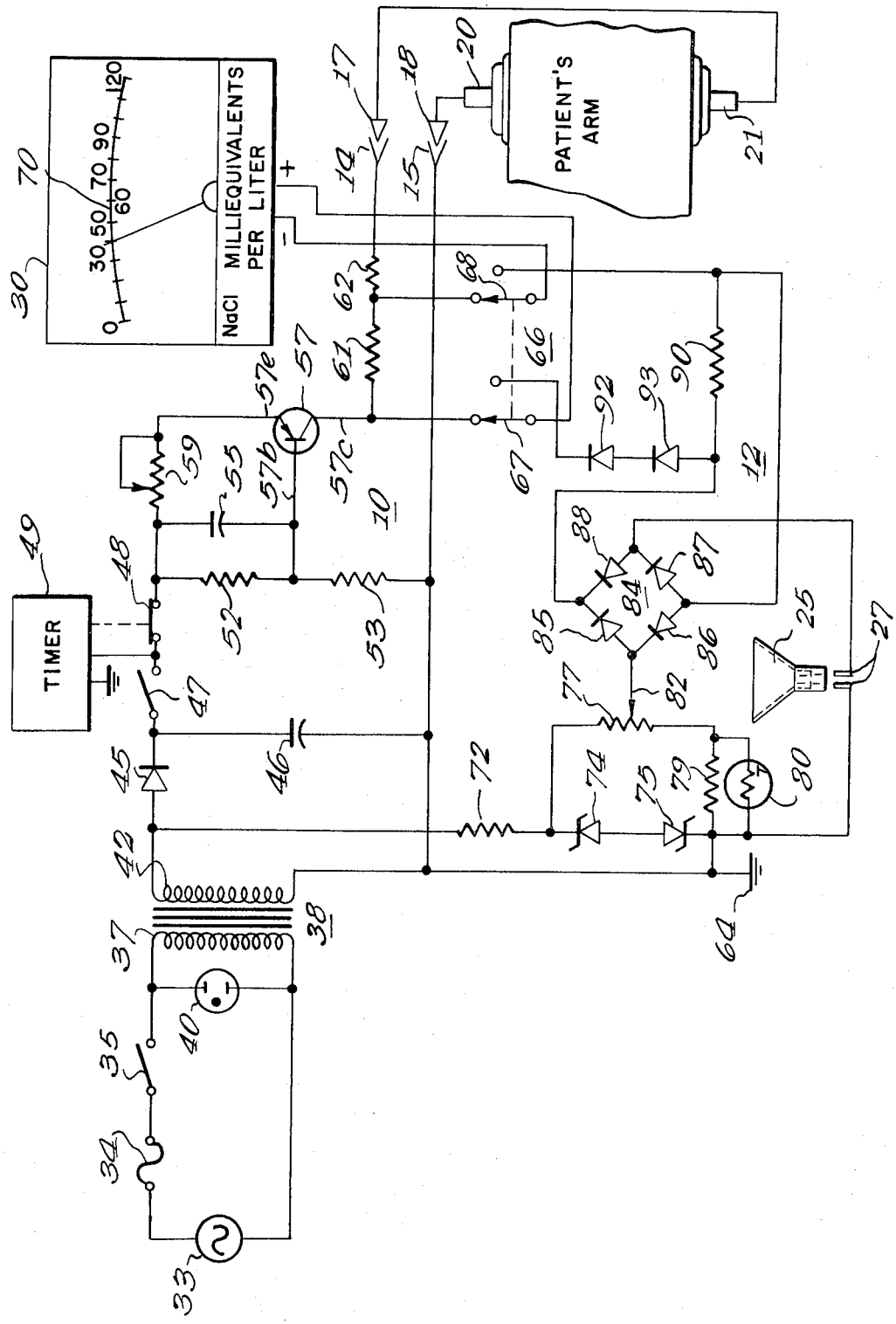

IONTOPHORESIS AND CONDUCTIVITY ANALYSIS CIRCUIT

This application is a divisional application of copending application Ser. No. 880,807, filed Nov. 28, 1969, now abandoned.

This invention relates to a circuit for effectuating iontophoresis and analyzing the products obtained therefrom.

Iontophoresis is a medical technique for introducing drugs through intact skin. In the detection of cystic fibrosis in children, it is known that the great majority of children suffering with cystic fibrosis have an abnormally high concentration of sodium chloride in their sweat. An effective means of detecting such disease is to collect sweat produced by pilocarpine iontophoresis, and analyze the sweat for chloride concentration by using various methods including conductivity of the sweat sample.

Localized sweating may be induced by using electrodes filled with iontophoresis inducing solutions. The electrodes, after being strapped to a patient's arm, are connected to a source of DC voltage. Due to differences in individual patients, and other factors including placement of the electrodes on the patient, the amount of direct current passed through the electrodes may vary widely, and in some circumstances may reach unsafe levels. Prior iontophoresis circuits have depended upon a technician continually monitoring a meter in order to insure that the current does not exceed a preselected level.

The present invention provides in part an improved iontophoresis circuit which eliminates the problems of prior circuits by insuring that the direct current passed to the iontophoresis electrodes cannot exceed a preselected maximum value. The desired value of current can be selected once by the technician, and the circuit automatically compensates for differences between various patients.

After the iontophoresis electrodes have been energized for a short time period, the source of DC therefore is deactuated and the electrodes are removed from the patient's arm. Skin area into which pilocarpine has been induced will now produce localized sweating, allowing the sweat to be collected in order to be analyzed.

Typical prior circuits for analyzing a sweat sample use a multivibrator to continuously energize and then deenergize a relay. The contacts of the relay, which switch at the frequency of the multivibrator, connect different DC polarities to a bridge circuit which includes the resistivity of the sweat sample. Additional relay contacts connect the bridge circuit to a DC meter. The meter reading, which only indicates the conductivity of the sweat sample, must be converted by the technician into milliequivalents of sodium chloride per liter, by using a nonlinear graph.

Such prior circuits have many disadvantages. Electromechanical switching by relays or the like cause the analyzer to require frequent servicing. The circuit itself is complex and expensive to build and maintain. Furthermore, the visual output is an oscillating value which is difficult to read, and is not the final desired reading, but must be converted by use of a chart, all of which increase the possibility of error.

The present invention provides, in part, an improved analyzer circuit with solid state components for eliminating electromechanical switching. Furthermore, by use of a nonlinear and scale expanding circuit, the conductivity of the sweat sample is converted directly into a reading of sodium chloride milliequivalents per liter, eliminating charts and other sources of error, and saving the time of the technician.

One object of this invention is the provision of an improved circuit for effectuating iontophoresis and then analysis of sweat samples obtained thereby.

One feature of this invention is the provision of an iontophoresis circuit which includes a current limitor for preventing current to iontophoresis electrodes from exceeding a predetermined level, and which includes means for timing the duration of the current flow and for controlling the magnitude of current flow to the patient.

Another feature of this invention is the provision of a conductivity analysis circuit which employs all solid state components to eliminate electromechanical switching.

Yet another feature of this invention is the provision of a sweat analysis circuit which has a direct, readout of milliequivalents of sodium chloride per unit volume.

Further features and advantages of the invention will be apparent from the following description and from the single FIGURE which shows a schematic diagram of the iontophoresis and conductivity analysis circuit.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

Turning to the single FIGURE, a circuit is illustrated which includes a section 10 for effectuating iontophoresis, and a section 12 for analyzing a sweat sample obtained after iontophoresis of a patient, with certain elements of the circuit being used in common by both sections of the circuit. Iontophoresis section 10 generates a direct current which is supplied to a pair of output terminals 14 and 15. By means of plugs 17 and 18, the direct current is supplied to a pair of iontophoresis electrodes 20 and 21, illustrated on the arm of a patient.

Iontophoresis electrodes 20 and 21 may be any conventional electrodes used for the purpose of inducing localized sweating. Typically, one electrode would be filled with a 0.5 percent solution of pilocarpine nitrate, and the other electrode with a 1 percent solution of sodium nitrate. After being strapped to the patient's arm, positive DC voltage available from output terminal 14 is connected to the electrode containing pilocarpine nitrate, and negative DC voltage available from output terminal 15 is connected to the electrode connecting sodium nitrate. By way of example, the electrodes may be of the form disclosed in the copending application of Richard A. Reeves, Ser. No. 880,767, now U.S. Pat. No. 3,677,268 entitled "Iontophoresis Electrode," filed on even date herewith, and assigned to the assignee of the present application.

After about 5 minutes of iontophoresis the circuit automatically stops the flow of current, and plugs 17 and 18 may be removed and the electrodes 20 and 21 removed from the patient's arm. When using the iontophoresis technique for the detection of cystic fibrosis, the forearm of the patient is washed with distilled water and wiped dry after which a sweat collecting cup 25 is placed over the forearm where the electrode containing pilocarpine nitrate was located.

After about a 25 minute time period, the contents of the sweat collecting cup 25 are measured to determine the concentration of sodium chloride by analysis section 12, in order to detect for the presence of cystic fibrosis in the patient. By way of example, the sweat collecting cup 25 may include a pair of electrodes for direct connection to a pair of input receptacle leads 27 for analysis section 12. Such a combination cup and electrodes is shown in the copending application of James F. LaHay, Ser. No. 880,810, now U.S. Pat. No. 3,635,213 entitled "Collection and Measuring Electrode," filed on even date herewith, and assigned to the assignee of the present application. If other types of collection apparatus are used, it is necessary to transfer the sample into some holder of predetermined volume, which is adapted for connection to receptacle leads 27, in order to allow a current to pass through the sweat sample. The circuit section 12 produces a reading on a meter indicator 30 which is directly calibrated in units of sodium chloride milliequivalents per liter, or other unit volume.

Considering the circuit in detail, a source 33 of AC voltage supplies power through a fuse 34 and single-pole, single-throw switch 35 to the primary winding 37 of a step-down transformer 38. A neon lamp 40 is coupled across primary winding 37 to indicate when switch 35 is closed to supply power to the circuit. A secondary winding 42 of transformer 38 supplies AC voltage to both the iontophoresis section 10 and the analysis section 12 of the circuit.

For powering iontophoresis section 10, secondary winding 42 is coupled to series connected diode 45 and 100 microfarad capacitor 46. Diode 45 and capacitor 46 form a half wave rectifier. The resulting DC voltage available across capacitor 46 is coupled through a single-pole, single-throw switch 47 and a normally closed single-pole, single-throw relay switch 48 from a timer 49 to a voltage divider consisting of a 1,500 ohm resistor 52 in series with a 6,800 ohm resistor 53. Resistor 52 is shunted by a 1,000 microfarad capacitor 55, for reasons to be explained.

In order to automatically compensate for differences between patients, a constant current source is provided in order to control the flow of current to terminals 14 and 15 and maintain the flow at a selectable fixed current value even though different patients are connected to the electrodes 20 and 21. The current source includes a semiconductor device as a PNP transistor 57, type 2N3638, having its emitter electrode 57e coupled through a 6,000 ohm potentiometer 59 to the junction between switch 48 and resistor 52. Potentiometer 59 includes a wiper shorted to one side of the variable resistor in order that the resistance value can be continuously varied from zero to the maximum value, herein 6,000 ohms. The base electrode 57b is directly coupled to the junction between voltage divider resistors 52 and 53. The collector electrode 57c is coupled through a 33 ohm resistor 61 and a 6,800 ohm resistor 62 to output terminal 14. Output terminal 15 is coupled to the junction between capacitor 46 and resistor 53, which junction also serves as a source of reference potential or ground 64. Resistor 61 provides a voltage drop thereacross for monitoring the current to the electrodes 20 and 21. This voltage drop is supplied to the left most illustrated terminals of a two position switch 66, the ganged wipers 67 and 68 of which connect to the positive and negative input terminals, respectively, of meter 30, in the form of a DC voltmeter.

A scale 70 on meter 30 indicates the conductivity of the sweat samples analyzed by section 12, as will appear, and also may be used to relatively indicate the range of current which is flowing to effectuate iontophoresis. Potentiometer 59 is adjusted by the technician performing iontophoresis to select the current value that the constant current source thereafter maintains regardless of the impedance characteristics of the patient. Resistor 62 insures that the iontophoresis current is limited to a safe value should the solid state current source fail.

In operation, the technician straps the electrodes 20 and 21 to the patient's arm and connects the plugs 17 and 18 to the output terminals 14 and 15. Thereafter, switch 47 is closed to supply DC power to the constant current source, thereby generating current to effectuate iontophoresis. At the same time, the DC power is also supplied to timer 49, which has a timing period equal to the desired time duration that current should flow to effectuate iontophoresis, such as 5 minutes. Capacitor 55 causes the iontophoresis current to increase gradually to reduce patient discomfort at initial energization of the electrodes 20 and 21. This eliminates the need for the technician to perform this function. After the lapse of the timing period, timer 49 energizes an internal relay (not illustrated) to cause relay contact 48 to open, thereby terminating the iontophoresis current. Now, the technician may remove the electrodes 20 and 21, open switch 47, and collect a sweat sample in cup 25. The opening of switch 47 disconnects power from timer 49, causing contact 48 to return to its normally closed position. The circuit is now returned to a rest position and is ready to analyze the sweat sample just obtained.

Analyzer section 12 is powered by DC voltage which continuously alternates in polarity. The alternating polarity DC source includes a 680 ohm resistor 72 in series with a back-to-back pair of unidirectional semiconductor voltage breakdown devices, as Zener diodes 74 and 75, connected in shunt across secondary winding 42 of transformer 38. Each Zener diode may be a type 1ZM62. The back-to-back Zener diodes 74 and 75 are shunted by a 1,000 ohm potentiometer 77 connected in series with a paralleled 470 ohm resistor 79 and a thermistor 80. Potentiometer 77 has a wiper 82 for supplying current to the remainder of analyzer section 12.

In operation, the Zener diodes 74 and 75 square the alternating current from secondary winding 42, and in effect form a source of essentially fixed magnitude DC voltage, which switches polarity at a rate equal to the frequency of AC source 33. Thermistor 80 is chosen to have a curve which compensates for changes in ambient temperature which would otherwise affect the magnitude of square waves coupled to wiper 82.

Wiper 82 is connected to a solid state, full wave rectifier network 84 consisting of four unidirectional conduction devices such as diodes 85, 86, 87 and 88, connected to form a full wave bridge. Wiper 82 connects to the junction between diodes 85 and 86. The corresponding junction on the opposite side of the bridge, namely, between diodes 87 and 88, is coupled to one of the terminals 27 of the sweat sample. The opposite of terminals 27 is connected to ground 64, which forms the opposite side of the square wave voltage supply.

Since the sweat sample is in series with the square wave supply for full wave bridge rectifier 84, the resistivity of the sweat sample directly affects the magnitude of current to the bridge circuit. The output of the bridge circuit, in the form of full wave rectified DC square waves, is available across a 3,400 ohm resistor 90 connected to the junctions between diodes 85 and 88 and diodes 86 and 87. Therefore, the magnitude of direct current through resistor 90 is directly proportional to the conductivity of the sweat sample, which in turn indicates the relative concentration of sodium chloride for the given volume of sweat sample contained in cup 25.

As is well known, the curve of sodium chloride milliequivalents per unit volume is not directly linearly related to the resistivity of a sweat sample. Prior analyzers have required a technician to read a nonlinear graph in order to convert a current indication, such as available from resistor 90, into an appropriate reading. In the present circuit, this is automatically accomplished by a conversion network inserted between resistor 90 and voltmeter 30. When analyzer section 12 is to be operative, switch 66 is thrown so that the right hand illustrated contacts connect to wipers 67 and 68. In this position, one side of resistor 90 is directly connected to the negative input of voltmeter 30. The positive input to the voltmeter is connected through a pair of series connected, nonlinear conducting elements having a semiconductor junction, such as diodes 92 and 93, to the opposite side of resistor 90, which connects to the junction between diodes 85 and 88. Diodes 92 and 93, such as type 1N4001, are chosen to have nonlinear conducting curves which expand the meter scale 70 where the readings have the most clinical significance, namely at mid-scale.

In operation, the current through resistor 90 produces a voltage drop which causes current to pass in a nonlinear manner through diodes 92 and 93 to produce a reading on the scale 70 of voltmeter 30. The scale 70 is marked with advancing indicia, directly in terms of milliequivalents sodium chloride per volume unit. Thus, upon connecting a sample of sweat to inputs 27, a direct reading in terms of the final desired quantity is obtained. The illustrated circuit also provides various peripheral advantages concerning the use of solid state components and the regulated source of square wave voltage. These include elimination of periodic calibration and testing which would otherwise be required. Of course, analysis section 12 may be used to measure the conductivity of fluids other than sweat, and scale 70 may be calibrated in units appropriate to the particular conductivity readings of samples which are to be analyzed by the unit. For example, the scale 70 may be calibrated in terms of total electrolyte concentration.

Other equivalent uses for the circuit will be apparent to those skilled in the art.

We claim:

1. A circuit for analyzing the concentration of sodium chloride in a sample of sweat from a patient for detecting cystic fibrosis comprising: means for generating a current proportional to the conductivity of the sample; indicator means having a scale with indicia directly readable in milliequivalents of sodium chloride per unit measure of volume of sweat; and circuit means coupled between said generating means and said indicator means for supplying current to said indicator means in response to said proportional current, said circuit means including non-linear means connected to said indicator means to reduce the non-linearity of said current supplied to said indicator means with respect to the concentration of sodium chloride in the sample over a current range corresponding to the most clinically significant range for detecting cystic fibrosis, said scale indicia being correlated with said current supplied to said indicator means to provide readings in said clinically significant range.

2. The circuit of claim 1 wherein said nonlinear means comprise at least one unidirectional conduction device having a semiconductor junction.

3. The circuit of claim 1 wherein said generating means includes a source of AC, solid state means coupled to said AC source causing a current which continuously alternates in polarity to flow in a first circuit path which includes said sample at a substantially constant voltage value, said circuit means including solid state means coupled between said first circuit path and said indicator means for converting the current of continuously alternating polarity into a direct current, and said indicator means being responsive to direct current.

4. The circuit of claim 3 wherein said solid state converting means includes full wave rectifying means for producing full wave rectified direct current from the current flowing in said first circuit path.

5. The circuit of claim 1 wherein said scale indicia are substantially equally spaced over said range of milliequivalents, and said scale includes numbers directly reading in milliequivalents of sodium chloride per unit measure of volume of sweat.

6. The circuit of claim 5 wherein said current generating means include a source of alternating current and a full-wave rectifier connected to pass alternating current through said sample of sweat and full-wave rectified current through said non-linear means and said indicator means.

7. A circuit for analyzing the concentration of sodium chloride in a sample of sweat from a patient for detecting cystic fibrosis comprising circuit means including voltage supply means, a pair of spaced electrodes coupled to said supply means for passing current through a sample of sweat, and voltage dropping means coupled to said electrodes and said supply means for providing a voltage drop across the voltage dropping means proportional to the conductivity of the sample of sweat, a meter indicator having a scale with indicia thereon for directly reading sodium chloride milliequivalents per unit volume of sweat, and means coupling said voltage dropping means to said meter indicator including non-linear means to supply current to said meter indicator which is non-linear with respect to said voltage drop to thereby reduce the non-linearity of said meter indicator current with respect to the concentration of sodium chloride in the sample over a range of current values corresponding to the most clinically significant range for detecting cystic fibrosis, said indicia being correlated with said meter indicator current and substantially equally spaced over said clinically significant range.

8. The circuit of claim 7 wherein said voltage supply means includes a source of alternating current for passing alternating current through the sample of sweat, said voltage dropping means comprises resistance means connected in series circuit relation with said electrodes and said supply means, and said non-linear means is connected in series with said meter in parallel circuit relation with said resistance means.

9. The circuit of claim 8 wherein said circuit means further includes solid state rectifier means coupled between said meter and said electrodes whereby said meter current is rectified.

10. The circuit of claim 9 wherein said rectifier means is a full-wave rectifier connected in series circuit relation with said electrodes to pass alternating current from said supply means to said electrodes and pass full-wave rectified current through said meter.

* * * * *